(12) United States Patent
Porter et al.

(10) Patent No.: US 12,471,526 B2
(45) Date of Patent: Nov. 18, 2025

(54) GROUNDS MAINTENANCE APPARATUS WITH FOLDING HANDLE

(71) Applicant: THE TORO COMPANY, Bloomington, MN (US)

(72) Inventors: Todd A. Porter, Rosemount, MN (US); Brandon N. Imsdahl, St. Paul, MN (US); Ryan M. Petersen, Shoreview, MN (US)

(73) Assignee: THE TORO COMPANY, Bloomington, MN (US)

( * ) Notice: Subject to any disclaimer, the term of this patent is extended or adjusted under 35 U.S.C. 154(b) by 369 days.

(21) Appl. No.: 15/967,757

(22) Filed: May 1, 2018

(65) Prior Publication Data
US 2024/0049631 A1 Feb. 15, 2024

(51) Int. Cl.
*A01D 34/82* (2006.01)
*A01D 34/68* (2006.01)
*A01D 101/00* (2006.01)

(52) U.S. Cl.
CPC .......... *A01D 34/824* (2013.01); *A01D 34/68* (2013.01); *A01D 2101/00* (2013.01)

(58) Field of Classification Search
CPC ............ A01D 34/824; A01D 34/67–69; A01D 34/6806; F16B 2001/0028; Y10T 24/44017; Y10T 24/44026; Y10T 24/32; A44D 2203/00
See application file for complete search history.

(56) References Cited

U.S. PATENT DOCUMENTS

| | | | | |
|---|---|---|---|---|
| 1,561,554 A | * | 11/1925 | Little | F21V 21/0965 362/398 |
| 2,393,149 A | * | 1/1946 | Cunningham | B62B 7/02 280/654 |
| 2,644,212 A | * | 7/1953 | Markowitz | B43K 23/001 24/11 R |
| 2,727,753 A | * | 12/1955 | Johnson | A01D 34/824 280/655.1 |

(Continued)

FOREIGN PATENT DOCUMENTS

| CN | 106471993 A | 3/2017 |
|---|---|---|
| DE | 20 2013 100 236 U1 | 3/2013 |

(Continued)

OTHER PUBLICATIONS

Black and Decker Inc., "19 Inch (483mm) Cordless Mulching Rear Bag Mower" Instruction Manual. Catalog Number CM1936. Form No. 90548344. Black & Decker (U.S.) Inc., Towson, Maryland. Copyright Oct. 2010; 47 pages.

*Primary Examiner* — Joseph M Rocca
*Assistant Examiner* — Julia C Tran
(74) *Attorney, Agent, or Firm* — Mueting Raasch Group (57) ABSTRACT

A grounds maintenance apparatus adapted for movement from a horizontal operating orientation to a vertical storage orientation. An operator handle of the apparatus may be moved from an operating position during operation, to a folded position for storage. A passive retainer may hold the handle in the folded position. Embodiments of such grounds maintenance apparatus further provide an auxiliary lift handle adapted for gripping by an operator when moving the apparatus between the horizontal operating orientation and the vertical storage orientation.

15 Claims, 8 Drawing Sheets

(56) References Cited

U.S. PATENT DOCUMENTS

| | | | | |
|---|---|---|---|---|
| 2,965,386 A * | 12/1960 | Buske | .................. | A01D 34/824 280/47.371 |
| 3,038,737 A * | 6/1962 | Lill | ...................... | A01D 34/824 280/655.1 |
| 3,116,937 A * | 1/1964 | Price | .................... | A01D 34/824 280/655.1 |
| 3,144,258 A * | 8/1964 | Ottosen | ................ | A01D 34/824 280/47.36 |
| 3,170,005 A | 2/1965 | Phillips | | |
| 3,256,869 A | 6/1966 | Nutten et al. | | |
| 3,423,103 A * | 1/1969 | Maltarp | ............... | A01D 34/824 280/655.1 |
| 3,527,469 A * | 9/1970 | Gobin | .................. | A01D 34/824 280/655.1 |
| 3,618,174 A * | 11/1971 | Schainholz et al. | .... | A41F 1/002 24/303 |
| 3,694,855 A * | 10/1972 | Meyer | .................... | A01D 34/49 16/437 |
| 3,816,873 A * | 6/1974 | Thorud | ................ | A01D 34/824 16/437 |
| 3,855,763 A * | 12/1974 | Seifert | .................... | A01D 34/63 56/320.2 |
| 4,416,108 A | 11/1983 | Ghandhi | | |
| 4,989,299 A * | 2/1991 | Morita | ................. | A44C 5/2071 24/303 |
| 5,209,051 A * | 5/1993 | Langdon | ................ | A01D 34/81 16/437 |
| 5,242,072 A | 9/1993 | Koebernik | | |
| 5,261,215 A * | 11/1993 | Hartz | .................... | A01D 34/81 16/437 |
| 5,582,145 A | 12/1996 | Aizawa et al. | | |
| 5,636,504 A | 6/1997 | Kaley et al. | | |
| 5,709,185 A | 1/1998 | Aizawa et al. | | |
| 5,924,400 A | 7/1999 | Kobayashi | | |
| 6,082,083 A | 7/2000 | Stalpes et al. | | |
| 6,561,206 B1 * | 5/2003 | Wilkinson | ............ | A61H 3/0244 135/65 |
| 7,258,362 B2 | 8/2007 | Thurm | | |
| 8,123,266 B1 * | 2/2012 | Jone | ..................... | A01K 23/005 294/1.5 |
| 8,403,278 B1 * | 3/2013 | Kasbohm | ................ | F41A 23/18 248/206.5 |
| 8,713,761 B2 * | 5/2014 | Grewe | .................... | B62B 5/064 16/437 |
| 9,038,356 B2 | 5/2015 | Shao et al. | | |
| 9,433,147 B2 | 9/2016 | Schmalz | | |
| 9,439,352 B2 * | 9/2016 | Arvidsson | ............ | A01D 34/824 |
| 9,462,747 B2 | 10/2016 | Schmalz | | |
| 9,596,806 B2 | 3/2017 | Yamaoka et al. | | |
| 9,826,686 B2 | 11/2017 | Yamaoka et al. | | |
| 9,848,531 B2 | 12/2017 | Wadzinski et al. | | |
| 9,888,627 B2 | 2/2018 | Yamaoka et al. | | |
| 9,986,686 B2 | 6/2018 | Yamaoka et al. | | |
| 10,070,588 B2 | 9/2018 | Yamaoka et al. | | |
| D890,510 S * | 7/2020 | Crown | ................. | D3/8 |
| 2003/0182919 A1 | 10/2003 | Baumann et al. | | |
| 2005/0167547 A1* | 8/2005 | Mclellan | ................ | F16B 2/005 248/74.4 |
| 2006/0053762 A1* | 3/2006 | Stover | .................... | A01D 34/67 56/16.7 |
| 2009/0250889 A1* | 10/2009 | Palmore | .................... | B62B 5/06 280/47.21 |
| 2011/0193306 A1* | 8/2011 | Mozo | ...................... | B62B 5/067 16/422 |
| 2013/0111866 A1* | 5/2013 | Schmalz | ................ | A01D 34/68 123/196 R |
| 2014/0102064 A1* | 4/2014 | Yamaoka | ............. | A01D 34/006 56/10.5 |
| 2016/0016306 A1* | 1/2016 | Haddon | ................... | B25H 5/00 211/70.6 |
| 2016/0047494 A1* | 2/2016 | Dickinson | ................. | F16B 1/00 248/74.2 |
| 2016/0198627 A1* | 7/2016 | Wadzinski | ........... | A01D 34/001 56/320.1 |
| 2016/0353660 A1 | 12/2016 | Yamaoka et al. | | |
| 2017/0015340 A1* | 1/2017 | Fitzwater | ................ | B62B 3/007 |
| 2017/0022859 A1 | 1/2017 | Schmalz | | |
| 2017/0086370 A1 | 3/2017 | Yamaoka et al. | | |
| 2017/0086375 A1 | 3/2017 | Yamaoka et al. | | |
| 2017/0202138 A1* | 7/2017 | Pellenc | ................. | A01D 34/78 |
| 2018/0228089 A1 | 8/2018 | Yamaoka et al. | | |
| 2020/0154867 A1* | 5/2020 | Lucky | ...................... | F16B 1/00 |

FOREIGN PATENT DOCUMENTS

| | | | | |
|---|---|---|---|---|
| EP | 0 835 987 A2 | 4/1998 | | |
| EP | 1 201 882 A1 | 5/2002 | | |
| EP | 0 962 630 B1 | 7/2003 | | |
| EP | 0 903 074 B1 | 1/2004 | | |
| EP | 1561372 A1 * | 8/2005 | ........... | A01D 34/824 |
| EP | 1 731 015 A1 | 12/2006 | | |
| EP | 1 731 016 A2 | 12/2006 | | |
| EP | 2 589 284 B1 | 3/2016 | | |
| EP | 3 045 030 B1 | 10/2017 | | |
| GB | 2 401 909 A | 11/2004 | | |
| JP | H10-288019 A | 10/1998 | | |
| WO | WO 00/70211 A1 | 11/2000 | | |

\* cited by examiner

GROUNDS MAINTENANCE APPARATUS WITH FOLDING HANDLE

Embodiments described herein are directed to grounds maintenance apparatus such as lawn mowers, and more particularly, to apparatus and methods for accommodating an operator handle in a folded position.

BACKGROUND

Grounds maintenance apparatus such as walk-power lawn mowers are known. Typically, such mowers utilize a horizontal cutting deck having a rearwardly extending operator handle. During use, the cutting deck is in a horizontal operating orientation, wherein the deck is generally supported above a ground surface by a plurality of support wheels. The operator may walk behind the mower and control it via the operator handle. When not in use, the mower is typically stored (e.g., in a garage or shed) with the deck in the same horizontal operating orientation. Often, the operator handle may fold, e.g., to a vertical position, to reduce the storage footprint of the mower.

SUMMARY

Apparatus and methods in accordance with embodiments of the present disclosure provide a handle that accommodates vertical storage of the apparatus. For example, in one embodiment, a grounds maintenance apparatus is provided that includes a body having an upper wall, wherein the upper wall, when the body is in an operating orientation, is horizontal and, when in a storage orientation, is vertical. The apparatus further includes: a plurality of wheels adapted to support the body upon a ground surface; a tool associated with the body; and a prime mover adapted to provide power to the tool. A handle is pivotally attached to the body about a pivot axis, wherein the handle is pivotable between: an operating position wherein the handle extends upwardly and rearwardly from the body; and a folded position wherein the handle is located proximate the prime mover. The mower further includes: a lock adapted to positively lock the handle in the operating position when the body is in the operating orientation; and a passive retainer adapted to provide a holding force that passively holds the handle in the folded position when the body is in the storage orientation.

In another embodiment, a lawn mower is provided that includes a cutting deck having an upper wall and downwardly extending sidewalls that together form a cutting chamber. The sidewalls include at least a front sidewall. The upper wall, when the deck is in an operating orientation, is horizontal and, when in a storage orientation, is vertical. The mower further includes: a plurality of wheels adapted to support the cutting deck upon a ground surface; a rotatable cutting blade contained within the cutting chamber; and a prime mover attached to the upper wall and adapted to provide power to the cutting blade. A handle is pivotally attached to the deck, the handle pivotable between: an operating position, wherein the handle extends upwardly and rearwardly from the deck; and a folded position, wherein the handle is located proximate the prime mover. The mower also includes: a lock adapted to positively lock the handle in the operating position when the deck is in the operating orientation; and a magnet operatively connected to either the handle or the cutting deck, the magnet adapted to magnetically engage a target operatively connected to the other of the handle or the cutting deck when the handle is in the folded position.

In still another embodiment, a lawn mower is provided that includes a cutting deck having an upper wall and downwardly extending sidewalls that together form a cutting chamber. The sidewalls include at least a front sidewall. The upper wall, when the deck is in an operating orientation, is horizontal and, when in a storage orientation, is vertical. The mower also includes: a plurality of wheels adapted to support the cutting deck upon a ground surface; a rotatable cutting blade contained within the cutting chamber; and an engine attached to the upper wall and adapted to provide power to the cutting blade. A handle is pivotally attached to the deck and is pivotable between: an operating position wherein the handle extends upwardly and rearwardly from the deck; and a folded position wherein the handle is located proximate the engine. The mower also includes: a lock adapted to positively lock the handle in the operating position when the deck is in the operating orientation; and a lift handle positioned at or near the front sidewall, the lift handle adapted to be gripped by an operator during movement of the cutting deck between the operating orientation and the storage orientation.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 2A-2B are side elevation views of the mower of FIG. 1 with the handle shown in a folded position, wherein: FIG. 2A shows the mower in the operating orientation; and FIG. 2B shows the mower after movement to a storage orientation;

FIGS. 4A-4C illustrate passive retainers for use with the mower of FIG. 1, wherein: FIG. 4A shows the mower in the horizontal operating orientation and the handle in the folded position; FIG. 4B shows a mount for the exemplary passive retainer of FIG. 4A isolated from the mower; and FIG. 4C shows a passive retainer in accordance with another embodiment of this disclosure;

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Further, the terms "Figure" and "FIG." may be used interchangeably herein.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may or may not be specifically described and/or illustrated herein, are contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.), in the specification and claims are understood as being modified by the term "about." Further, the term "and/or" (if used) means one or all of the listed elements or a combination of any two or more of the listed elements. Still further, "i.e." may be used herein as an abbreviation for id est, and means "that is," while "e.g.," may be used as an abbreviation for exempli gratia, and means "for example."

In some embodiments, a grounds maintenance apparatus (e.g., power equipment unit such as a lawn mower) is provided that includes a body (e.g., deck) supporting a tool (e.g., grass cutting blade). A plurality of wheels connected to the body may support the body in rolling engagement with a ground surface while the apparatus (e.g., the body) is in a horizontal operating orientation. Moreover, one or more wheels (e.g., a set of rear wheels) may be proximate or in contact with the ground surface while another wheel (e.g., a set of front wheels) are elevated above the ground surface when the apparatus/body is in a vertical storage orientation. The apparatus may also include a handle that permits the operator to interact and control the apparatus during operation. The handle may be movable between an operating position, corresponding to the apparatus being in the horizontal operating orientation, and a folded position, accommodating the apparatus when in the vertical storage orientation. In some embodiments, the body of the apparatus moves 80-100 degrees, e.g., 90 degrees, between the horizontal operating orientation and the vertical storage orientation.

Figure 1:
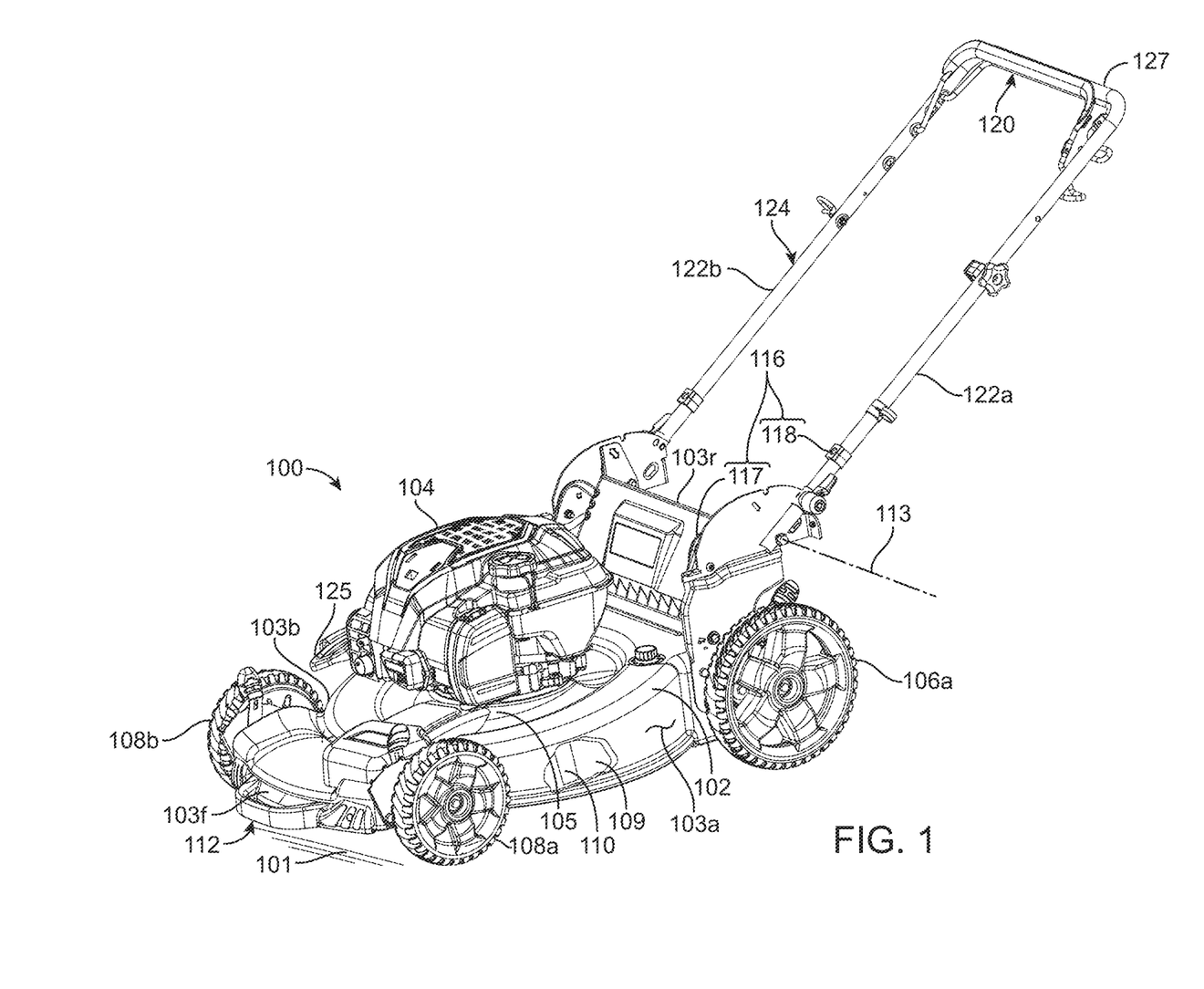
FIG. 1 is a perspective view of a grounds maintenance apparatus, e.g., a lawn mower having a body or deck, in accordance with embodiments of the present disclosure, the mower shown in a horizontal operating orientation, wherein a handle of the mower is shown in a corresponding operating position.

With reference to the figures of the drawing, wherein like reference numerals designate like parts and assemblies throughout the several views, FIG. 1 illustrates an exemplary ground maintenance apparatus. While not wishing to be bound to a specific configuration, the grounds maintenance apparatus may, in some embodiments, be configured as a walk-behind (walk-power) mower 100 having a rearwardly extending handle 124. While shown as a walk-behind mower, the grounds maintenance apparatus could be configured as most any ground working apparatus including, e.g., a snowthrower, cultivator, dethatcher, aerator, etc.

Figure 2A:
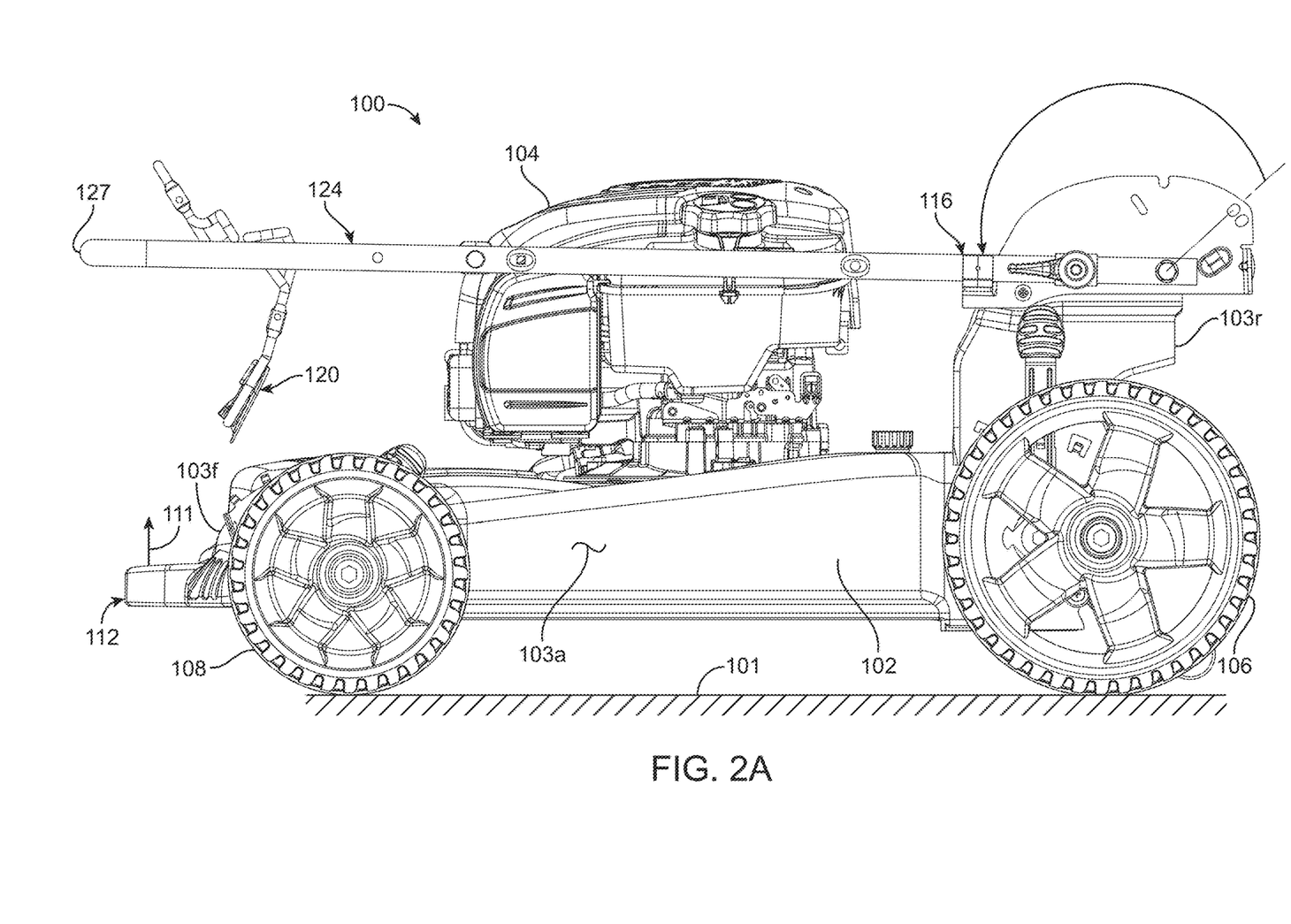
Figure 2B:
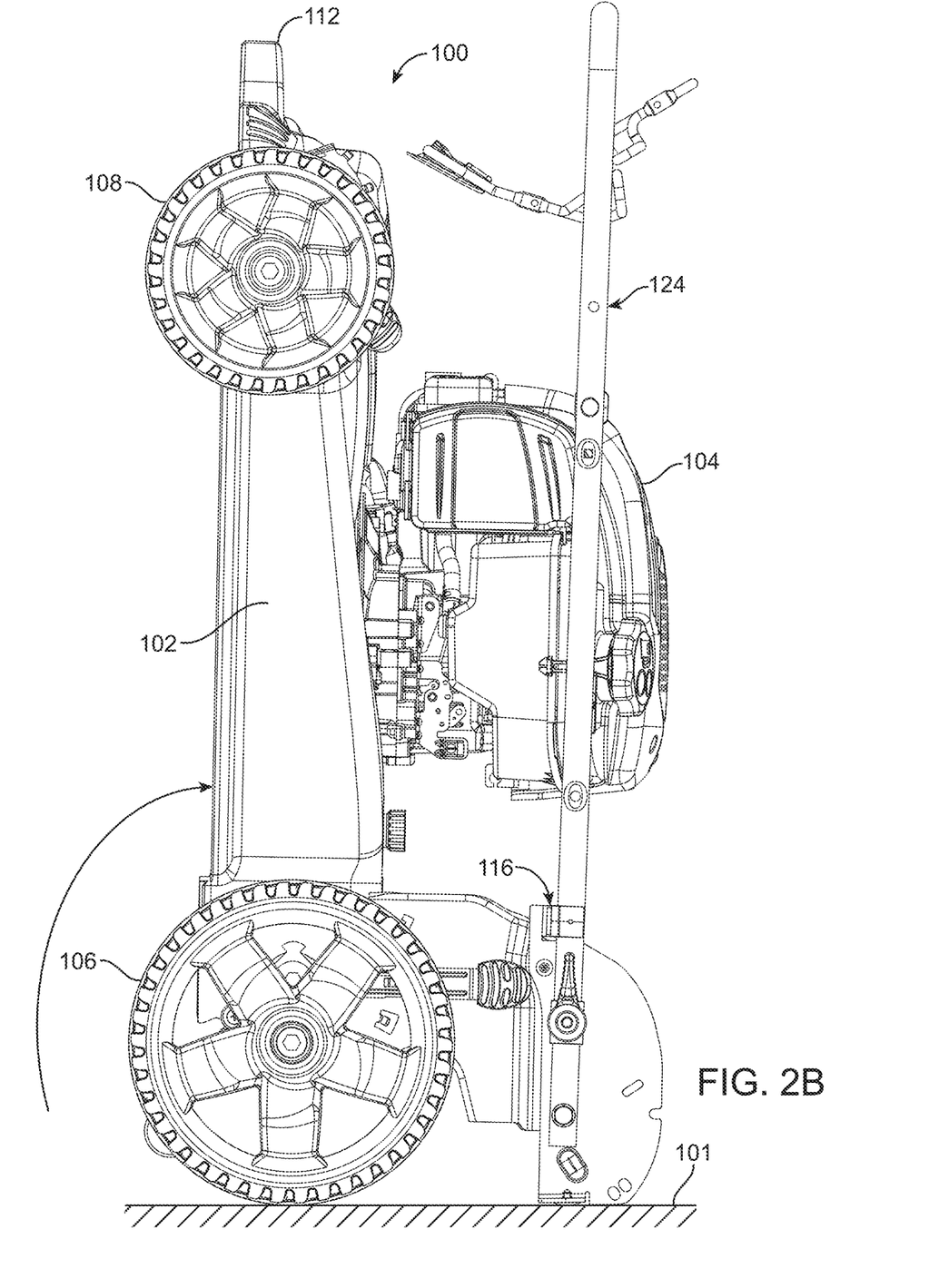

The mower 100 may include a prime mover (e.g., internal combustion engine 104) that includes fluid containment features that permit the mower to be oriented in the horizontal operating orientation as shown in FIG. 1, and alternatively in the vertical storage orientation shown in FIG. 2B without leakage of fluids (e.g., fuel, oil). Some embodiments described herein permit such vertical storage by using a set of rear wheels, and portions of the deck, to engage the ground surface when the mower is in the vertical storage orientation. This same set of rear wheels can also engage the ground surface when the mower is in the horizontal operating orientation. In other embodiments, secondary storage wheels (not illustrated, but see U.S. Pat. No. 9,848,531) are provided that may, instead of or in addition to the rear wheels, engage the ground surface when the mower is in the vertical storage orientation.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," and the like may be used herein and, if so, are (unless otherwise noted) from the perspective of one operating the exemplary mower 100 while the mower is in the operating orientation, e.g., while the mower 100 is positioned such that wheels 106 and 108 rest upon a generally horizontal ground surface 101 as shown in FIG. 1. These terms are used only to simplify the description, however, and not to limit the interpretation of any embodiment described.

The terms "horizontal" and "vertical" are used herein to describe operating and storage orientations, respectively. However, these terms are used only to indicate general, relative locations of the body/cutting deck and not to limit the actual orientations to only those orthogonal positions. For example, when in either the operating orientation or the storage orientation, the body/cutting deck may be in most any angular orientation relative to ground. In fact, conventional cutting decks may be inclined from horizontal during operation to improve mowing efficiency.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

While the general construction of the exemplary mower 100 is not necessarily central to an understanding of exemplary embodiments (e.g., other mower configurations are certainly contemplated), the mower 100 is briefly described below. In some embodiments, the exemplary mower may incorporate aspects of mowers described in US-2003-0182919 to Baumann et al.

FIG. 1 illustrates the mower 100 having a body (e.g., cutting deck 102) with front and rear sides or edges and left and right sides or edges. The mower 100 may further include, for supporting the mower 100/deck 102 in rolling engagement with a ground or lawn surface 101, a plurality of ground-engaging members, e.g., wheels. For example, rear wheels 106 (e.g., left wheel 106a and right wheel (the latter not visible, but generally a mirror image of the former) may be attached, respectively, at or near the left and right rear corners of the deck 102) and front wheels 108 (left and right front wheels 108*a*, 108*b* attached, respectively, at or near the left and right front corners of the deck 102) may be provided as shown.

The deck 102 may also include an upper wall 105 and one or more downwardly extending sidewalls 103 (left sidewall 103*a*, right sidewall 103*b*, front sidewall 103*f*, and rear sidewall 103*r*) that, at least in some embodiments, together form a downwardly (as viewed in FIG. 1) opening cutting chamber 109 (see cut-away section of sidewall 103*a* in FIG. 1). The mower 100 may also include a prime mover, e.g., an internal combustion engine 104 that, in one embodiment, is attached to the upper wall 105 of the deck 102 and is adapted to provide power to a cutting blade 110. While illustrated herein as an internal combustion engine 104, alternative prime movers, such as an AC- or DC-powered electric motor, are also contemplated.

The engine 104 may be oriented such that its crankshaft (not shown) extends vertically downward (in FIG. 1) through the upper wall 105 of the deck 102 and into the cutting chamber 109. A ground-working tool (e.g., cutting member or blade 110) may attach to an end of the crankshaft and be contained within the cutting chamber or otherwise associated with the deck 102. During operation, the crankshaft rotates the cutting blade 110 at a speed sufficient to sever grass and other vegetation over which the deck 102 passes. In other embodiments, the engine 104 could be oriented to accommodate other tools (e.g., snow blower, cultivator, etc.). Moreover, while shown having four wheels, other embodiments may utilize any number of wheels (e.g., two or more) without departing from the scope of this disclosure. Still further, as used herein, "wheels" may include other ground-engaging members such as tracks, skids, and rollers.

As stated above, the mower 100 may be self-propelled in that one or more of its wheels 106, 108 receive driving power from the engine 104 via a transmission system (not shown). For example, the transmission may form part of a propulsion system adapted to drive one or more of the wheels 106, 108 in any combination (e.g., drive one or both of the front wheels, one or both of the rear wheels, one front and one rear wheel, or all four of the wheels). Alternatively, the wheels may be passive (e.g., non-driven), in which case the mower may be propelled by the operator pushing on a handle 124 (described below).

The mower 100 may be configured for various operating modes. For example, the mower 100 may be configured for ejecting grass clippings cut by the mower into a grass catcher (not shown) through a discharge port (also not shown) when the mower is in a bagging mode. The mower 100 may further include a side discharge outlet (selectively covered by a door 125, the door shown open in FIG. 1) for ejecting grass clippings to the side of the mower when the mower is operating in a side discharge mode (the side discharge mode shown in FIG. 1). Finally, the mower may be configured in a mulching mode (not shown). In the mulching mode, the door 125 and the discharge port are closed, thereby containing grass clippings within the deck 102 during mowing such that the clippings are repeatedly cut before falling back to the ground surface 101.

In some embodiments, the mower 100 may include an operator handle 124 formed by one or more handle members or tubes 122 (e.g., first (left) and second (right) handle tubes 122*a* and 122*b*, respectively) that attach to the deck 102. When in an operating position, the handle 124 extends generally upwardly and rearwardly as shown in FIG. 1. The handle tubes 122 may be laterally spaced from, and parallel to, one another and joined near their upper ends by a transverse grip area 127, producing a generally U-shaped handle.

The handle 124 may be pivotally attached to the cutting deck 102, e.g., at or near the rear sidewall 103*r* as shown for pivoting about a transverse pivot axis 113. The handle 124 may also include various controls 120 for controlling mower operation. For instance, controls for propulsion, operator presence detection, blade engagement, etc., may be provided near the grip area 127. As a result, an operator walking behind the mower 100 may grasp the handle 124 (grip area 127) and control mower operation via manipulation of the handle 124 and the various controls 120 located thereon. In some embodiments, the handle 124 and controls 120 may be configured as generally described in U.S. Pat. No. 6,082,083 to Stalpes et al.

During operation, the mower 100 may be configured in the horizontal operating orientation as shown in FIG. 1, wherein the mower 100 (e.g., the deck 102 and upper wall 105) may be generally horizontal. However, to minimize storage space requirements when not in use, mowers in accordance with embodiments of the present disclosure may be configured to move from the operating orientation of FIG. 1, to the vertical storage orientation shown in FIG. 2B. In the vertical storage orientation, the mower (e.g., the deck and upper wall) may be generally vertical. Movement of the mower 100 to the vertical storage orientation may first require movement of the handle 124 from the operating position of FIG. 1 to a folded position shown in FIG. 2A, wherein the handle 124 is located proximate the engine 104 (e.g., where the handle extends generally parallel to the deck). Once the handle 124 is in the folded position, the mower 100 may be rotated to the position shown in FIG. 2B.

Figure 3:
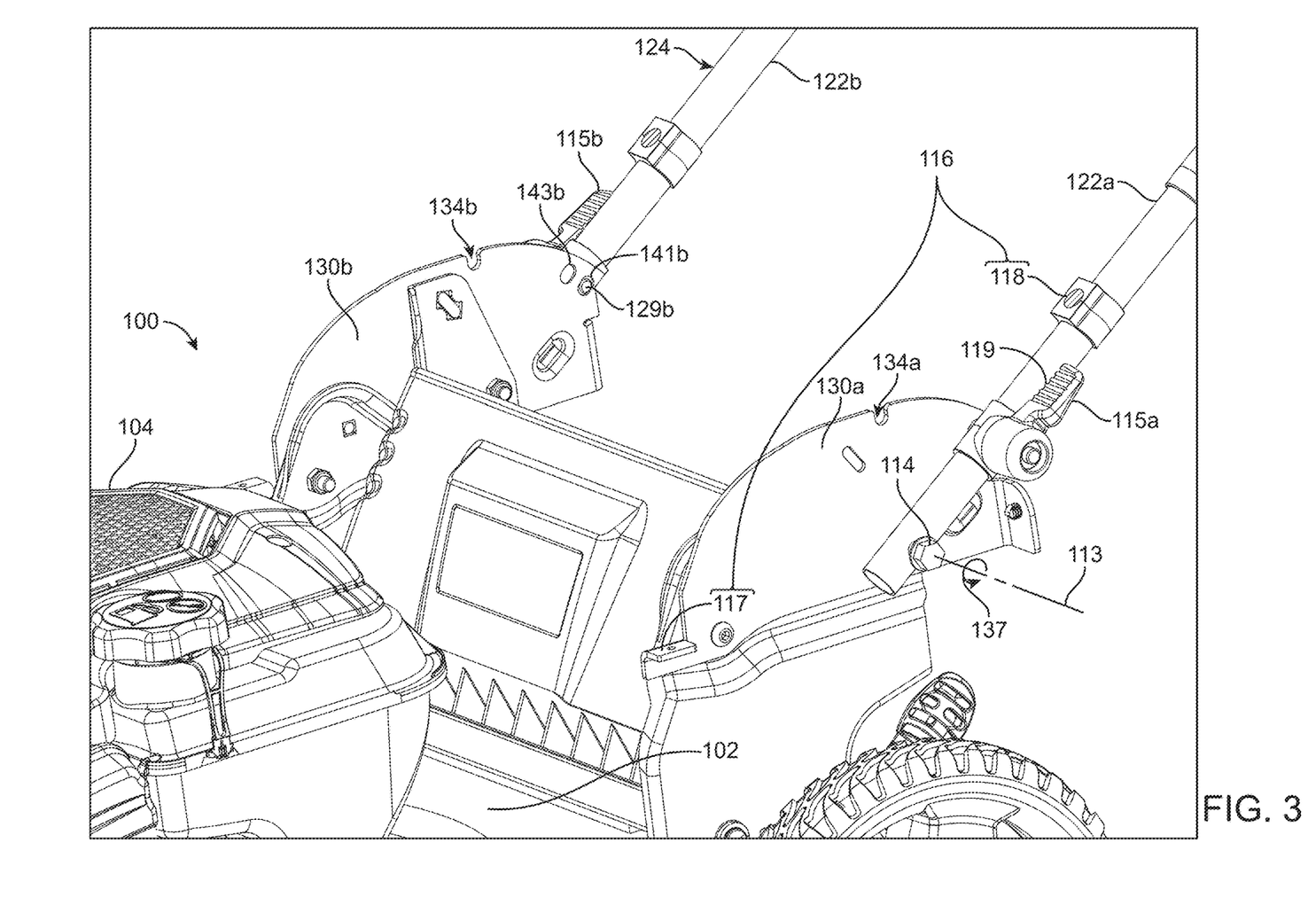
FIG. 3 is an enlarged perspective view of a portion of the mower of FIG. 1 with the mower shown in the horizontal operating orientation and the handle in the operating position.

To hold the handle 124 in the folded position during transition of the mower 100 to, and while the mower is in, the vertical storage orientation, a passive retainer or holder 116 as shown in FIG. 3 may be provided. In the illustrated embodiments, the passive holder 116 includes a magnet 118 operatively connected to either the handle 124 or the deck 102, and a magnetic target 117 operatively connected to the other of the handle or the deck (as used herein, "operatively connected" may include both: connecting one part directly to another part; and connecting one part indirectly to another part via one or more intermediate parts). When the magnet 118 engages or abuts the magnetic target 117 (which may occur when the handle 124 is in the folded position of FIGS. 2A-2B), magnetic attraction/engagement between the magnet 118 and target 117 produces a holding force that passively holds the handle 124 in the folded position (such a holding force may also be referred to herein as a holding torque that resists pivoting of the handle 124 (about the axis 113) away from the folded position). As used herein, "passive" refers to holding the handle in a position (e.g., in the folded position) without positive locking or latching. That is, passive holders may hold the handle in the folded position only until a force exceeding the holding force (e.g., a pivot torque exceeding the holding torque) is applied, at which time the handle may move away from the folded position.

Thus, even when the passive holder is engaged, the operator may move the handle 124 away from the folded position by application of a force to the handle (e.g., applied by the operator to the grip area 127 of the handle 124) that produces a separation force between the magnet 118 and the magnetic target 117 that exceeds the holding force. Stated another way, a separation force in excess of the holding force causes the magnet 118 to separate from the target 117, thereby allowing the handle 124 to move away from the folded position and toward the operating position.

While the magnet 118 is illustrated on the handle 124 and the target 117 on the deck 102 (e.g., on an index plated 130 of the deck), such a configuration is not limiting. For example, the positions of the magnet and the target could be switched without departing from the scope of this disclosure. Moreover, while illustrated as providing the passive holder 116 on both sides of the mower 100, other embodiments may locate the passive holder on only one (e.g., left or right) side.

Because the handle 124 is not positively locked in the folded position (but rather passively held), the handle (e.g., grip area 127, controls 120) does not provide a useful gripping surface for moving the mower 100 between the operating and storage orientations. Accordingly, embodiments of the present disclosure may also provide a lift handle 112 positioned, at least in some embodiments, at or near the front sidewall 103f of the deck 102 (see FIG. 2A). The lift handle 112 may be gripped by an operator to move the deck 102 between the operating orientation and the storage orientation (while the handle 124 is in the folded position (see FIGS. 2A and 2B). More specifically, the lift handle 112 may be used to apply a lifting force 111 (see FIG. 2A) to pivot the front of the deck 102 upwardly, for example about an axis of the rear wheels 106 (via a contact point between the rear wheels and the ground surface). In addition, once the deck 102 is in the vertical storage orientation of FIG. 2B, the lift handle 112 may be used to roll the deck, upon the rear wheels 106 (by slightly tilting the mower 100 from the storage orientation), to allow movement of the mower 100 to the desired location.

Figure 5:
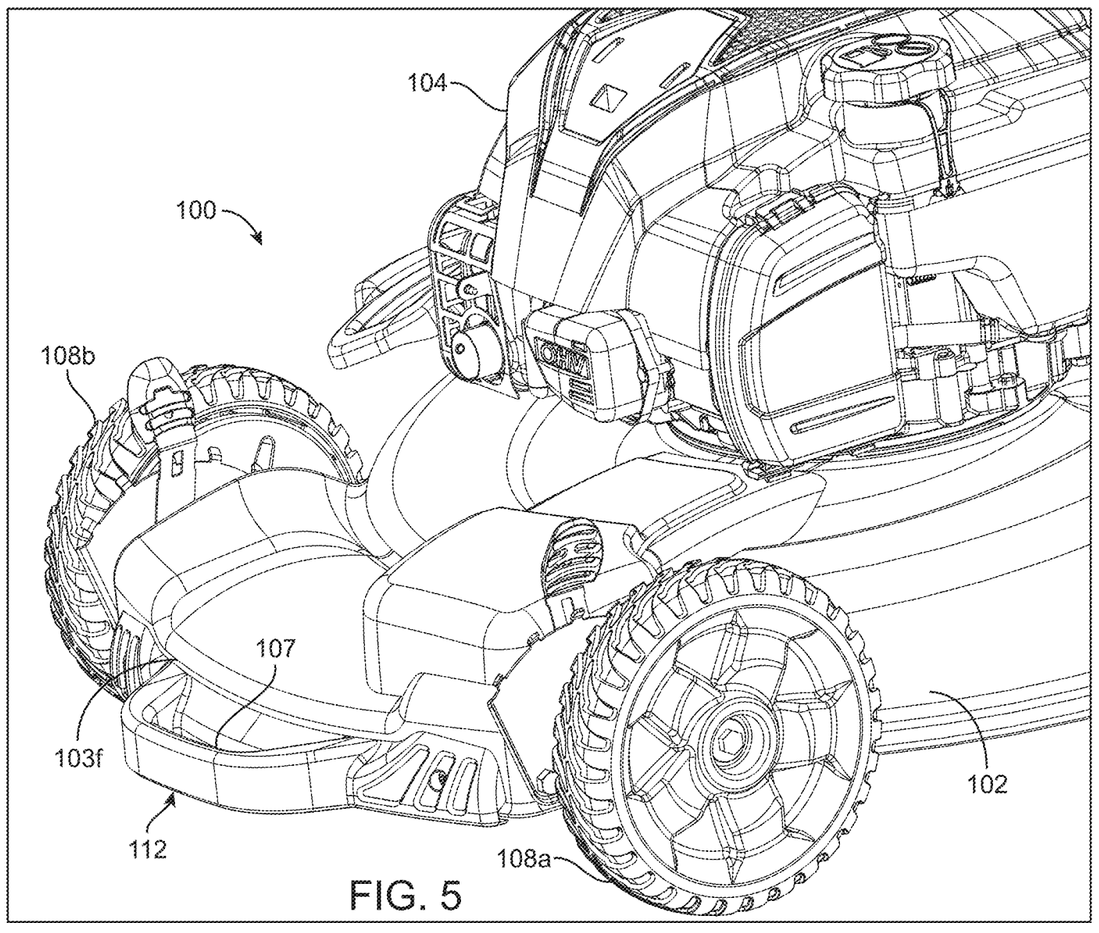
FIG. 5 is an enlarged perspective view of a front portion of the mower of FIG. 1.
Figure 6:
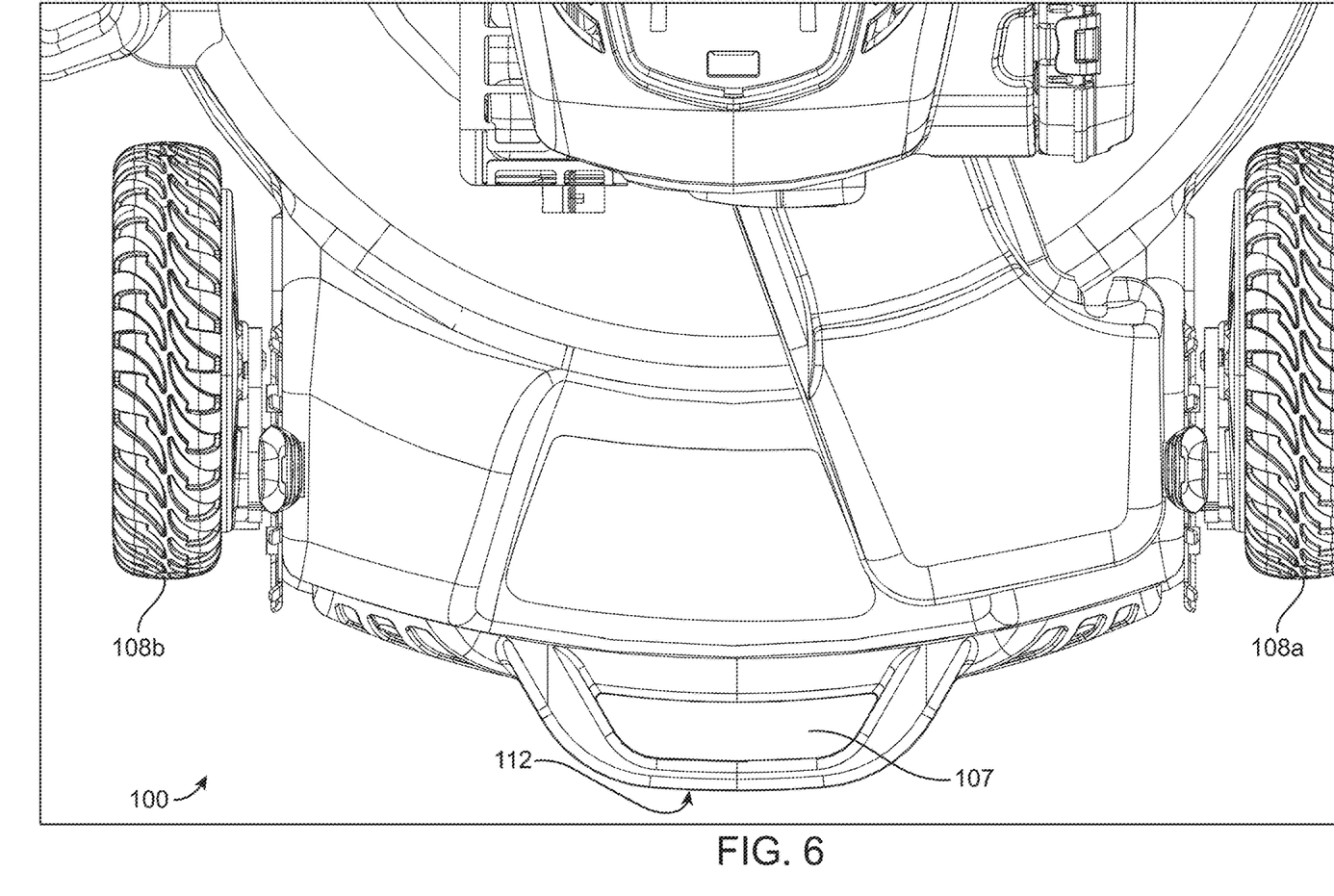
FIG. 6 is a top plan view of a front portion of the mower of FIG. 1.

The lift handle 112 may include a grip surface spaced-apart from the front sidewall 103f of the cutting deck 102 as shown in FIGS. 5 and 6. That is, the lift handle 112 may define an opening 107 through which the operator may insert his or her fingers during gripping. This configuration may provide not only a comfortable gripping surface, but also may ensure that the deck is gripped at a location that is outside of the cutting chamber 109. As indicated in FIG. 2B, the protruding lift handle 112 may also be located near an easily accessible, outer edge of the mower when in the storage orientation, providing a convenient and ergonomic location for gripping.

FIG. 3 further illustrates an exemplary interconnection of the handle 124 (handle tubes 122) with the deck 102. As shown in this view, the deck 102 may include generally vertical left and right index plates 103a, 130b to which handle tubes 122a, 122b, respectively, are pivotally connected, e.g., via a pin or fastener 114. As a result, the handle 124 may pivot, relative to the deck 102, about the transverse pivot axis 113 defined by the fasteners 114 (as illustrated by arrow 137).

The handle 124 may also include a lock, e.g., one or more lock levers 115, on each of the handle tubes 122. Each lock lever 115 includes a pin 129 (only pin 129b is visible) that is movable between an extended position wherein it may engage an aperture in the associated index plate, and a retracted position wherein it is withdrawn or disengaged from the aperture. In some embodiments, the pin 129 is moved between its extended and retracted positions via rotation of an arm 119 of the lock lever 115 between, respectively, locked and unlocked positions. When the handle 124 is in the operating position, and the lock levers are in the locked position, the pins 129 may extend into or engage associated openings 141, 143 formed on the index plates 130. This engagement effectively and positively locks the handle 124 in either of two operating positions (depending on whether the pins are engaged with opening 141 or 143). By providing two openings 141, 143, the handle 124 may be adjusted to suite operators of different heights.

When the operator wishes to move the handle 124 to the folded position of FIG. 2A, the arm 119 of each lock lever 115 may be rotated, e.g., 90 degrees, to the unlocked position, thereby moving its pin 129 to the retracted position. Once the pins 129 are in the retracted position, the handle 124 may pivot, about the axis 113 as illustrated by arrow 137, relative to the index plate 130 toward the folded position of FIG. 2A. In some embodiments, one or both index plates 130 may include a vertical notch 134 (134a, 134b) that can receive the associated pin 129 of the lock lever 115 (once the lock lever/arm is rotated back to the locked position) to allow locking of the handle 124 in a generally vertical position. Such a position may be beneficial to hold the handle in an intermediate storage position that allows reduction of the mower's storage footprint without requiring movement of the deck to the storage orientation.

The operator may also move the handle 124 from the operating position of FIG. 1 to the folded position of FIG. 2A by again rotating the arm 119 of each lock lever 115, thereby causing the pins 129 to move to their retracted positions. Once the pins are retracted, the operator may manually pivot the handle 124. When the handle 124 reaches the folded position of FIG. 2A (which will accommodate the deck 102 being in the storage orientation), the handle 124 is held in place (in the folded position) by the passive retainer 116 (e.g., magnet 118 and magnetic target 117) and not by any engagement of the lock lever pins 129 with the index plates 130. Once again, the holding force of the magnet 118 may be selected to hold the handle 124 in the folded position both during movement to, and while the mower is in, the storage orientation.

To disengage the handle 124 from the folded position, a pivot force or torque is applied to the handle 124 (e.g., upward and away from the deck 102) that causes a separation force at the magnet that exceeds the holding force. Once the magnet 118 separates from the magnetic target 117, the handle 124 may rotate freely towards the intermediate storage position, or to one of the operating positions. Once the handle 124 is at or near the desired position, the pins 129 of the lock lever 115 may again be manually moved (e.g., via rotation of the arm 119 of each lock lever) to their extended positions, wherein they may engage either the associated intermediate notches 134, or the notches 141, 143 associated with one of the operating positions.

Figure 4A:
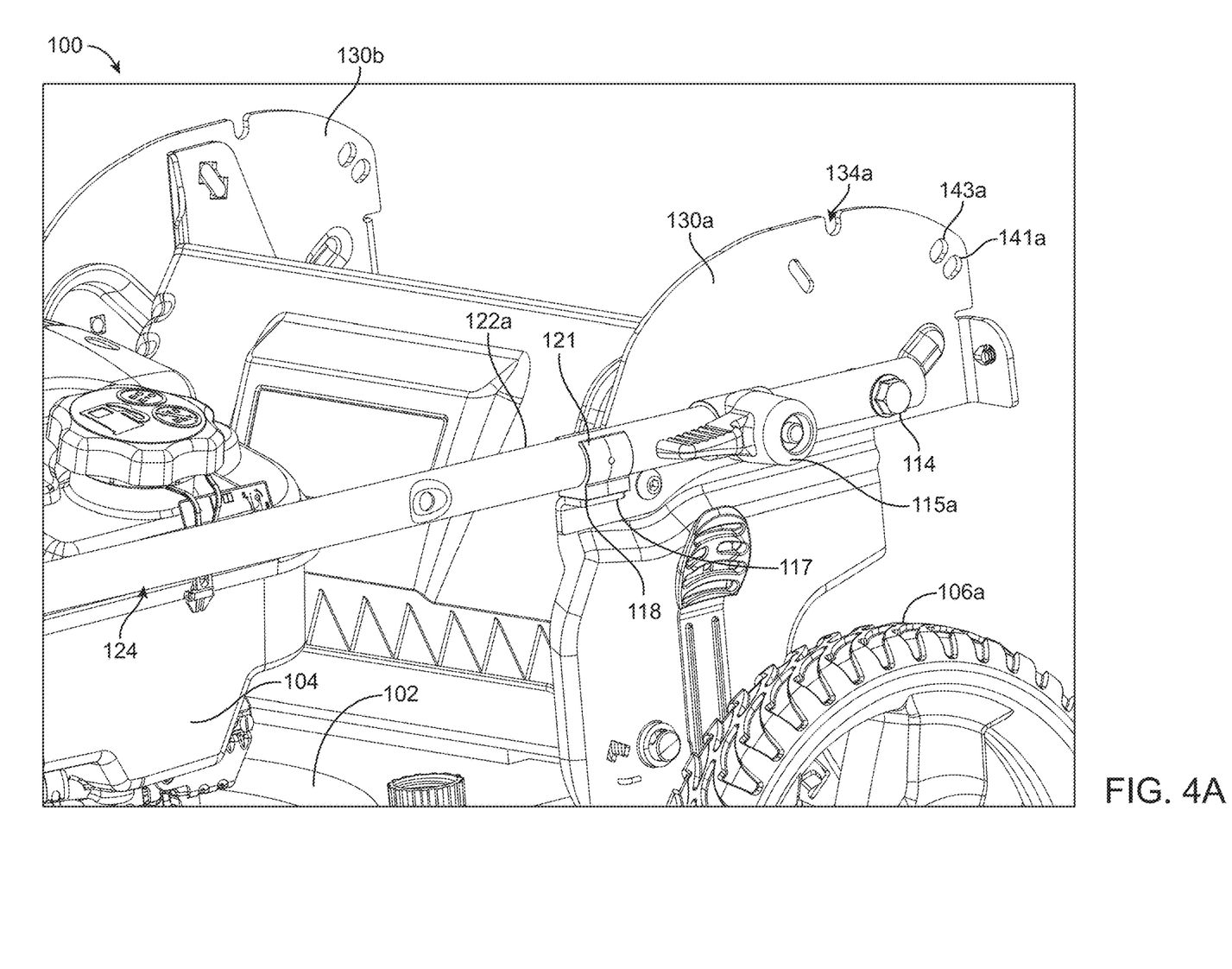
Figure 4B:
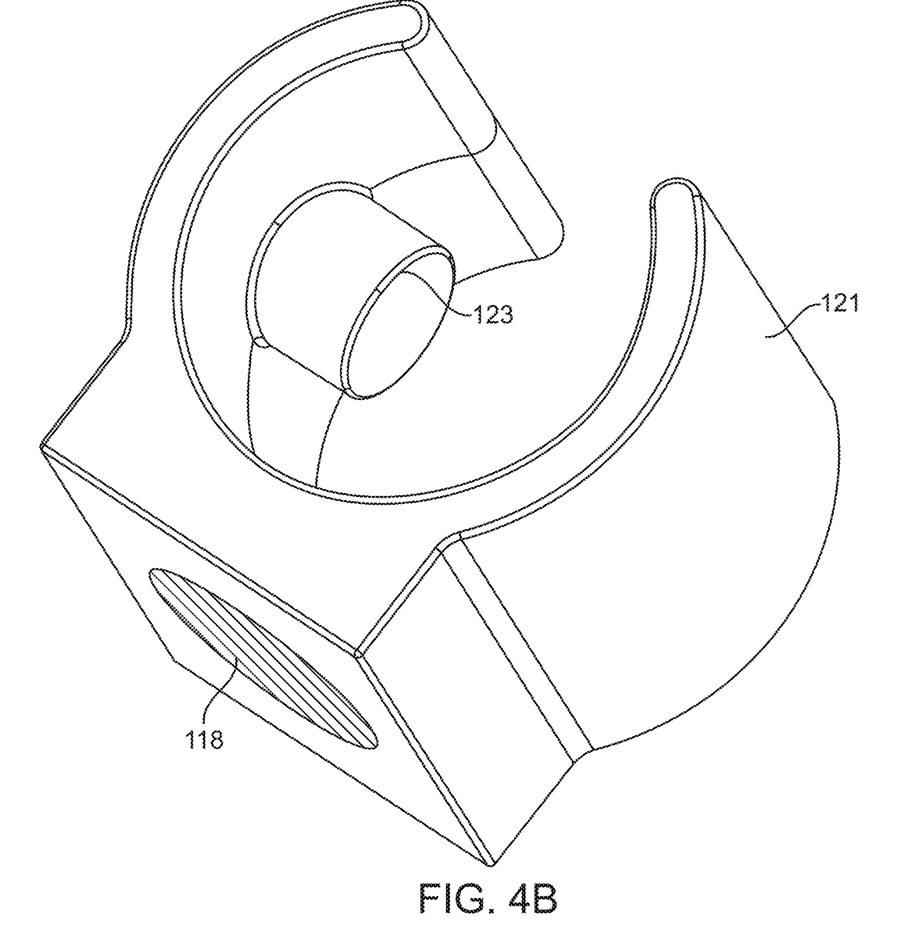

FIG. 4A is an enlarged perspective view of a portion of the mower 100 of FIG. 1 with the mower 100 shown in the horizontal operating orientation after the handle 124 has been moved to the folded position. As shown in this view, the tubes 122 (e.g., left tube 122a and right tube 122b (not pictured)) are held in the folded position by the passive holder 116 (e.g., magnet 118 and target 117). To locate the passive holder 116 (for example, the magnet 118) on the tube 122a, a mount 121 may be provided, an embodiment of which is shown isolated from the handle tube 122 in FIG. 4B. The mount 121 may, in some embodiments, be a resilient element that partially surrounds the handle tube in a snap-fit relation. To index the mount 121 relative to the tube 122, a pin 123 or other protrusion may be provided, e.g., on an inner surface of the mount. The pin 123 may engage a corresponding opening formed in the handle tube 122 that is located to ensure the magnet 118 is in the appropriate location. The mount 121 may include a recess adapted to receive therein the magnet 118 as shown in FIG. 4B. In some embodiments, the magnet 118 is press-fit into the recess. In other embodiments, the magnet may be fastened or adhered in the recess.

Figure 4C:
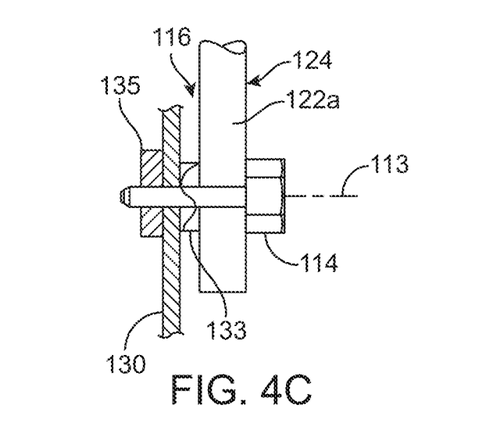

In still other embodiments, the passive holder 116 could utilize passive elements other than a magnet. For instance, the pin 114 could form a passive holder associated with the pivot joining the handle 124 to the deck as shown in FIG. 4C. In at least one example, the passive holder 116 could be configured as friction members 133 (e.g., friction washers, wave washers, elastomeric elements clamped by the pin 114/nut 135, or merely the tension force holding the pin in place) that provide a frictional holding force/torque that resists pivoting of the handle 124 about the pivot axis 113, whereby a force/torque exceeding the frictional holding force/torque would be required to pivot the handle away from the folded position. That is to say, the frictional force may produce a holding torque or force that could hold the handle 124 in the folded position until a pivot torque is provided (e.g., by the operator) about the pivot axis 113 that exceeds the holding torque. Any other friction members that can provide such a holding torque between the handle 124 and the deck 102 may also be used.

To again return the mower to the operating orientation, the operator may grip the lift handle 112 (enlarged isometric and plan views of the lift handle shown in FIGS. 5 and 6, respectively) and pivot the deck downwardly until the front wheels 108 again rest upon the ground surface 101 as shown in FIG. 2A. At this point, the operator may grasp the handle 124, e.g., at or near the grip area 127, and apply a pivot force. Once the pivot force creates a moment about the pivot axis 113 that is greater than the moment the passive retainer can resist, the handle 124 will release and move away from the folded position. The passive retainer is designed to release the handle from the folded position before lifting of the front wheels 108 from the ground surface occurs. Continued movement of the handle 124 may occur until the handle reaches the desired operating position. Mower operation may then commence.

The complete disclosures of the patents, patent documents, and publications cited herein are incorporated by reference in their entirety as if each were individually incorporated.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance apparatus comprising:
a body defining a body axis extending from a front end to a rear end of the body, the body comprising an upper wall, wherein the upper wall, when the body is in an operating orientation, is horizontal and, when in a storage orientation, is vertical;
a plurality of wheels adapted to support the body upon a ground surface, the plurality of wheels including a rear wheel coupled to the body proximate the rear end and defining a forwardmost wheel point and a rearwardmost wheel point when the body is in the operating orientation;
a tool associated with the body;
a prime mover adapted to provide power to the tool;
a handle pivotally attached to the body about a pivot axis, the pivot axis extending parallel to a rotational axis of the rear wheel and located proximate the rear wheel, the handle pivotable between:
an operating position wherein the handle extends upwardly and rearwardly from the body; and
a folded position wherein the handle is located proximate the prime mover;
a lock adapted to positively lock the handle in the operating position when the body is in the operating orientation;
a passive retainer located between a first plane containing the forwardmost wheel point and a second plane containing the rearwardmost wheel point, the first and second planes each being orthogonal to the body axis, the passive retainer adapted to provide a holding force that passively holds the handle in the folded position when the body is in the storage orientation, the passive retainer comprising a magnet connected to either of the handle or the body and a target coupled to the other of the handle or the body, wherein a radial distance from the magnet to the pivot axis is equal to a radial distance from the target to the pivot axis; and
a mount configured to operatively connect at least a portion of the passive retainer to the handle, the mount comprising a protrusion configured to engage the handle to index the mount relative to the handle.

2. The apparatus of claim 1, wherein the handle is adapted to move away from the folded position once a force in excess of the holding force is applied to the handle.

3. The apparatus of claim 1, wherein the magnet is adapted to magnetically engage the target when the handle is in the folded position.

4. The apparatus of claim 1, wherein the body further comprises a front sidewall and a lift handle positioned at or near the front sidewall, the lift handle adapted to be gripped by an operator during movement of the body from the operating orientation to the storage orientation.

5. The apparatus of claim 4, wherein the lift handle defines a grip surface spaced-apart from the front sidewall.

6. The apparatus of claim 1, wherein the protrusion of the mount is configured to engage an opening formed in the handle to locate the mount at the radial distance from the pivot axis of the handle.

7. A lawn mower comprising:
a cutting deck defining a cutting deck axis extending from a front end to a rear end of the cutting deck, the cutting deck comprising an upper wall and downwardly extending sidewalls that together form a cutting chamber, wherein the sidewalls comprise at least a front sidewall, and wherein the upper wall, when the deck is in an operating orientation, is horizontal and, when in a storage orientation, is vertical;
a plurality of wheels adapted to support the cutting deck upon a ground surface, the plurality of wheels including a rear wheel coupled to the cutting deck proximate the rear end and defining a forwardmost wheel point and a rearwardmost wheel point when the deck is in the operating orientation;
a rotatable cutting blade contained within the cutting chamber;
a prime mover attached to the upper wall and adapted to provide power to the cutting blade;
a handle pivotally attached to the deck about a pivot axis, the pivot axis extending parallel to a rotational axis of the rear wheel and located proximate the rear wheel, the handle pivotable between:

an operating position, wherein the handle extends upwardly and rearwardly from the deck; and a folded position, wherein the handle is located proximate the prime mover, as associated with the storage orientation;

a lock adapted to positively lock the handle in the operating position when the deck is in the operating orientation;

a magnet located between a first plane containing the forwardmost wheel point, and a second plane containing the rearwardmost wheel point, the first and second planes each being orthogonal to the cutting deck axis, the magnet operatively connected to either the handle or the cutting deck, the magnet adapted to magnetically engage a target operatively connected to the other of the handle or the cutting deck when the handle is in the folded position, wherein a radial distance from the magnet to the pivot axis is equal to a radial distance from the target to the pivot axis; and a mount configured to operatively connect either the magnet or the target to the handle, the mount comprising a protrusion configured to engage the handle to index the mount relative to the handle.

8. The mower of claim 7, wherein the handle comprises first and second spaced-apart handle tubes pivotally attached to the deck, wherein the magnet is operatively connected to the first handle tube via the mount and the target is operatively connected to the cutting deck.

9. The mower of claim 7, wherein the magnet provides a holding torque holding the handle in the folded position, and wherein the handle is adapted to move away from the folded position once a pivot torque applied to the handle exceeds the holding torque.

10. The mower of claim 7, wherein the prime mover is an internal combustion engine.

11. The mower of claim 7, wherein the protrusion of the mount is configured to engage an opening formed in the handle to locate the mount at a position on the handle radially displaced from the pivot axis of the handle.

12. A lawn mower comprising:

a cutting deck defining a cutting deck axis extending from a front end to a rear end of the cutting deck, the cutting deck comprising an upper wall and downwardly extending sidewalls that together form a cutting chamber, wherein the sidewalls comprise at least a front sidewall, and wherein the upper wall, when the deck is in an operating orientation, is horizontal and, when in a storage orientation, is vertical;

a plurality of wheels adapted to support the cutting deck upon a ground surface, the plurality of wheels including a rear wheel coupled to the cutting deck proximate the rear end and defining a forwardmost wheel point and a rearwardmost wheel point when the cutting deck is in the operating orientation;

a rotatable cutting blade contained within the cutting chamber;

an engine attached to the upper wall and adapted to provide power to the cutting blade;

a handle pivotally attached to the deck about a pivot axis, the pivot axis extending parallel to a rotational axis of the rear wheel and located proximate the rear wheel, the handle pivotable between:

an operating position wherein the handle extends upwardly and rearwardly from the deck; and a folded position wherein the handle is located proximate the engine, as associated with the storage orientation;

a lock adapted to positively lock the handle in the operating position when the deck is in the operating orientation;

a passive retainer located between a first plane containing the forwardmost wheel point, and a second plane containing the rearwardmost wheel point, the first and second planes each being orthogonal to the cutting deck axis, the passive retainer adapted to provide a holding force that holds the handle in the folded position, the passive retainer comprising a magnet operatively attached to either the handle or the deck and a magnetic target operatively attached to the other of the handle or the deck, wherein a radial distance from the magnet to the pivot axis is equal to a radial distance from the target to the pivot axis;

a mount configured to operatively connect at least a portion of the passive retainer to the handle, the mount comprising a protrusion configured to engage the handle to index the mount relative to the handle; and a lift handle positioned at or near the front sidewall, the lift handle adapted to be gripped by an operator during movement of the cutting deck between the operating orientation and the storage orientation.

13. The mower of claim 12, wherein the lift handle is positioned forward of the front sidewall.

14. The mower of claim 12, wherein the handle is pivotally attached to the cutting deck near a rear sidewall.

15. The mower of claim 12, wherein the protrusion of the mount is configured to engage an opening formed in the handle to locate the mount at a position on the handle radially displaced from the pivot axis of the handle.

* * * * *